Patented Jan. 6, 1953

2,624,655

UNITED STATES PATENT OFFICE 2,624,655

STABLE AQUEOUS HYDROGEN PEROXIDE AND METHOD OF PREPARING SAME

Frank P. Greenspan, Buffalo, N. Y., assignor to Buffalo Electro-Chemical Company, Inc., Tonawanda, N. Y.

No Drawing. Application October 13, 1949, Serial No. 121,220

12 Claims. (Cl. 23—207.5)

The present invention relates to the stabilization of aqueous solutions of hydrogen peroxide by the employment of pyridine carboxylic acids.

The commercial hydrogen peroxide of present day commerce is made almost universally by the anodic oxidation of bisulfates or sulfuric acid with subsequent hydrolysis of the resultant persulfate or persulfuric acid and distillation of hydrogen peroxide formed by such hydrolysis from the hydrolyzed mixture.

The so-called electrolytic hydrogen peroxide is generally acid and is, in many cases, too unstable for direct shipment in commerce without the addition of so-called stabilizers, that is, materials which increase the resistance of the peroxide to decompose into water and oxygen. The stabilizers which have found rather widespread use comprise inorganic substances, such as pyrophosphates or tin salts and organic substances such as phenacetin, 8 hydroxy quinoline, etc.

Desired characteristics for a hydrogen peroxide stabilizer are (1) effective stabilizing action in hydrogen peroxide solutions of all concentrations, e. g., 3% or 10 volume as well as in 27.5% or 100 volume, (2) production of clear and colorless solutions, even after further dilution with water, (3) resistance to oxidative attack by hydrogen peroxide and as a corollary, maintenance of effectiveness over long periods of storage, (4) resistance to decomposing action of contaminants.

In general, it can be said that $H_2O_2$ stabilizers currently being employed are found wanting in at least one or more of these requirements.

It is an object of the present invention to provide an aqueous hydrogen peroxide which is stabilized against decomposition into water and oxygen.

It is also an object of the present invention to provide a stabilized aqeous solution of hydrogen peroxide that is stable upon dilution with water and as a corollary thereto a class of stabilizing agents capable of stabilizing peroxide solutions of any strength.

It is a further object of the invention to provide a stabilized aqueous solution of hydrogen peroxide that is resistant to metal contamination.

It is also an object of the invention to provide a class of organic stabilizers that resist the oxidizing environment of aqueous hydrogen peroxide and that form clear and colorless solutions therewith.

In accordance with the broad aspects of the present invention, aqueous hydrogen peroxide solutions of substantially any peroxide strength appearing commercially, that is 3% by weight to 90% by weight, may be stabilized by the inclusion therein of small amounts of pyridine carboxylic acids. This group of heterocyclic acids are sufficiently soluble in water and in high concentration hydrogen peroxide to produce clear, colorless solutions containing a stabilizing amount of the acid. This group of acids are ideal organic stabilizers as they are resistant to the oxidative action of hydrogen peroxide even at relatively high temperatures and at high concentration of peroxide.

The commercial hydrogen peroxide, therefore, is treated with sufficient of a pyridine carboxylic acid, or a mixture of such acids, to induce the degree of stabilization desired. To this end, from traces to 1000 parts of the pyridine carboxylic acid are dissolved in the aqueous hydrogen peroxide to be stabilized, per million parts of the solution. The quantity of the pyridine carboxylic acid to be added will depend upon many factors such as the initial quality and strength of the hydrogen peroxide to be stabilized, the degree of stability desired in the end product, the intended use and treatment of the resultant stabilized product, i. e., whether to be diluted with water and the quality of the dilution water. In some instances, so little as 5 to 10 parts of the pyridine carboxylic acid per million parts of peroxide solution will suffice while, in others, the same degree of stabilization will require 300 to 400 parts per million. In general, 5 to 250 parts per million will be found effective upon average grades of commercial peroxide. Excellent stabilizing action is obtained using mono, as well as polycarboxylic acids.

Although the pyridine carboxylic acids are excellent stabilizers, a synergistic stabilizing effect is obtained by the addition to the peroxide solution with the pyridine carboxylic acid of a soluble phosphate such as phosphoric acid, sodium pyrophosphate, the molecularly dehydrated phosphates, e. g. tetra phosphates and hexa metaphosphates of the alkali or alkaline earth metals. The amount of phosphate and phosphoric acid may be less than or greater than the amount of the pyridine carboxylic acid employed.

Certain of the dicarboxylic acids of pyridine appear to possess a greater stabilizing effect than the mono or tri-carboxylic acid derivatives. Thus, quinolinic and dipicolinic acids appear to be more effective than picolinic or nicotinic acids and as between the dicarboxylic acids, dipicolinic acid appears to have a great stabilizing effect than, for instance, quinolinic acid or isocinchomeronic acid. Furthermore, the alkyl substituted pyridine carboxylic acids are also effective stabilizers.

Throughout the following tests where the strength of a solution of hydrogen peroxide is given as volume strength, it will be understood that 1 cc. of the aqueous solution will, when completely decomposed into water and oxygen, produce the stated volume of oxygen measured at 0° C. and 760 mm. of mercury pressure. Thus 1 cc. of a 10 volume peroxide solution will produce 10 ccs. of oxygen measured under standard conditions of temperature and pressure when completely decomposed.

In order to show the effectiveness of the stabilizers for the purposes of the invention, the following tests were developed and are given merely as illustrative of the invention and not as limitative thereof. These tests may be summarized as follows:

1. Stabilization of aqueous hydrogen peroxide of strengths of 27.5%, 35%, 70% and 90%. The determination of the relative stability of the stabilized solutions by determining the amount of oxygen lost after:

(a) An accelerated hot decomposition test and
   (b) A more practical gas evolution storage test.
   (c) Stability against deliberate iron contamination.

2. Stability of diluted stabilized solutions determined by:

(a) Hot test method and
   (b) Gas evolution method.

3. Resistance of stabilizer to attack by the oxidizing environment of the peroxide as determined by storage of pyridine carboxylic acid-stabilized peroxide, before dilution.

The stringent accelerated hot decomposition test comprised heating a measured sample (50 ml.) on a water bath at the temperature of boiling water, for 24 hours. Heating of the sample was carried out in a long-necked flask and the volume of the sample was brought up to the original volume by addition of distilled water. The active oxygen content of the original sample, before and after heating, was determined by titration with permanganate, and the active oxygen loss expressed in per cent of the original active oxygen content of the samples. The results are noted in per cent active oxygen loss. The per cent active oxygen retained is therefore 100 minus per cent active oxygen loss. In certain examples listed hereinafter, this latter figure is arbitrarily called the stability.

The gas evolution method comprises a determination of the rate of evolution of oxygen from a $H_2O_2$ sample. The determination is made by measuring the increase in gas pressure at constant volume over measured time intervals, and calculating from this data the per cent active oxygen loss per year. This procedure employs a variation of the Warburg apparatus.

A sample of 10 volume hydrogen peroxide containing 34 parts of quinolinic acid for each 1 million parts of peroxide solution, when subjected to the temperature of boiling water for 24 hours, as above described, retained 67.9% of its active oxygen, whereas the unstabilized solution without the quinolinic acid retains only 13% of its active oxygen.

A 10 volume sample of aqueous hydrogen peroxide from the same source and containing 17 parts of dipicolinic acid per million parts of peroxide, when subjected to the same test, lost only 1.2% of its active oxygen, i. e., it retained 98.8% of the original active oxygen.

The other pyridine carboxylic acids give similar results and 6-methylpicolinic acid, isonicotinic acid, isocinchomeronic acid and nicotinic acid possessed stabilizing characteristics in amounts ranging from 5 to 1000 parts per million parts of the peroxide, the best results being obtained when using dipicolinic acid as the preferred stabilizer.

Similar stabilizing results were obtained upon addition of the pyridine carboxylic acids to peroxide solutions of greater peroxide concentration than the 10 volume solutions (3%) tested above. These unstabilized solutions of 27½%, 35%, 70% and 90% hydrogen peroxide were all susceptible of stabilization with the improved stabilizers of the present invention.

Somewhat lesser quantities of the pyridine carboxylic acids are needed to obtain a desired degree of stabilization if a soluble phosphate is also added to the peroxide solution, or a greater degree of stability obtained from a given amount of pyridine carboxylic acid if a soluble phosphate or phosphoric acid, or both, is added together with the organic stabilizer.

The soluble phosphate employed may be an alkali metal salt of phosphoric acid, pyrophosphoric acid or the polyphosphoric acid salts such as the hexametaphosphates and the like, or a mixture of such phosphates or phosphoric acid and a soluble phosphate or mixture of such phosphates. This action is shown in the following examples.

To an unstabilized solution of hydrogen peroxide of 130 volume concentration, that is, a solution of 35% $H_2O_2$ by weight was added 221 parts per million of quinolinic acid, 166 parts per million of phosphoric acid and 169 parts per million of sodium hexametaphosphate. A sample of the solution so treated, when heated on the water bath at the temperature of boiling water for 24 hours, showed an active oxygen loss of only 9.7% of that originally present. This is in contrast with a sample of the same peroxide without stabilizer which showed, under the same test method, an active oxygen loss of 79%.

When substituting dipicolinic acid in the above amount of stabilizer, the active oxygen loss was only 0.7%.

A solution of 70% hydrogen peroxide containing 221 parts per million dipicolinic acid, 169 parts per million of sodium hexametaphosphate and 166 parts per million phosphoric acid, under the same test method showed an active oxygen loss of only 0.7%, and a solution of 90% $H_2O_2$ stabilized in a similar manner, showed an active oxygen loss of 1.0% after 24 hours at 100° C.

These data show not only excellent stabilizing action but possibly of even greater significance, the remarkable resistance of the stabilizer to oxidation under extremely severe conditions. It is to be noted that organic stabilizers for hydrogen peroxide rapidly lose their effectiveness because of oxidation, even in 3% $H_2O_2$ solutions. Unstabilized 70% hydrogen peroxide gave a 13% active oxygen loss and the 90% $H_2O_2$ a 3% active oxygen loss under the same testing conditions.

The stabilizers of the present invention resist contamination such as might occur when adding dilution water. A solution of the 70% hydrogen peroxide, after stabilization with the combined stabilizer, as described immediately above, when deliberately contaminated with a known peroxide decomposition catalyst, still showed excellent stability since, after contamination with 0.8 part per million of iron as a soluble iron salt and subjected for 24 hours to the temperature of boiling water, showed an active oxygen loss of only 2.8%.

The 70% peroxide without the stabilizer showed a 100% active oxygen loss when so deliberately contaminated; the unstabilized 70% product uncontaminated, showed a 13% active oxygen loss.

Additional results are given in Table 1 below, where the accelerated heat decomposition test was run upon a 10 volume product obtained by distilled water dilution of a 130 volume product stabilized as indicated. Recitation of the material "Calgon" hereinafter, is a trade name for a molecularly dehydrated phosphate known in the trade as sodium hexametaphosphate.

The peroxide stabilized according to the present invention retains its stability over storage periods of normal duration and at relatively high temperature, showing that there has been no loss in effectiveness of the catalyst as by oxidation or otherwise. Samples of 130 volume peroxide variously stabilized were stored at the indicated temperature for the times tested, then diluted with distilled water to 10 volume, and the stability tested by the accelerated test at 24 hours at 100° C., the percent oxygen retained being listed as the "stability."

TABLE 3

*Effect of storage of 130 vol. $H_2O_2$ stabilized with pyridine carboxylic acids on hot stability of 3% $H_2O_2$ prepared therefrom*

[*Procedure.*—Samples of 130 volume $H_2O_2$ variously stabilized were stored at 30° C. and 66° C. for times noted, then diluted to 10 volume with distilled $H_2O$ and stability tested for 24 hours at 100° C.]

| Stabilizer conc. in 130 volume | | | | Stability before storage [1] | Time and temperature of storage | Stability after storage [1] |
|---|---|---|---|---|---|---|
| Pyridine carboxylic acids | Calgon | $H_3PO_4$ | Total p.p.m. | | | |
| | P.p.m. | P.p.m. | | Percent | | Percent |
| Quinolinic, 221 p. p. m. | 169 | 166 | 556 | 92.0 | 1 mo. at 30° C. | 85.0 |
| Dipicolinic, 221 p. p. m. | 169 | 166 | 556 | 99.3 | 1 wk. at 30° C. | 99.2 |
| Do. | 169 | 166 | 556 | 99.3 | 1 mo. at 30° C. | 99.2 |
| Do. | 169 | 166 | 556 | 99.3 | 1 wk. at 66° C. | 99.0 |
| Do. | 169 | 166 | 556 | 99.3 | 2 wk. at 66° C. | 98.5 |
| Do. | 169 | 166 | 556 | 99.3 | 1 mo. at 66° C. | 94.2 |
| Isonicotinic, 221 p. p. m. | 169 | 166 | 556 | 92.0 | 1 mo. at 30° C. | 89.4 |
| 6-methyl-picolinic, 221 p. p. m. | 169 | 166 | 556 | 94.5 | ----do---- | 92.3 |
| Dipicolinic, 221 p. p. m. | 169 | 166 | 556 | 99.3 | 4 mo. at 30° C. | 98.5 |

[1] Percent active oxygen retained.

TABLE 1

| Stabilizer conc. in 130 Volume | | | | Equiv. conc. in 10 vol. $H_2O_2$ | Percent active oxygen loss |
|---|---|---|---|---|---|
| Pyridine carboxylic acid | Calgon | $H_3PO_4$ | Total p.p.m. | | |
| | P.p.m. | P.p.m. | | P.p.m. | |
| Picolinic, 221 p. p. m. | 169 | 166 | 556 | 43 | 14.5 |
| Isocinchomeronic, 221 p. p. m. | 169 | 166 | 556 | 43 | 10.5 |
| Dipicolinic, 221 p. p. m. | | | 221 | 17 | 1.2 |
| Dipicolinic, 111 p. p. m. | 84 | 80 | 275 | 21 | 1.0 |
| Isonicotinic, 221 p. p. m. | | | 221 | 17 | 23.7 |
| 6-Methylpicolinic, 221 p. p. m. | | | 221 | 17 | 3.5 |
| Commercial $H_2O_2$ | | | | | 60.0 |
| Unstabilized $H_2O_2$ | | | | | 87.0 |

The following results will give an excellent idea of the bottle stability of the products stabilized in accordance with the present invention. The following test results were obtained by gas evolution (pressure measurement at constant volume) from a 10 volume bath held at 30° C.

TABLE 2

*Room temperature stability of 10 vol. $H_2O_2$ prepared from 130 vol. $H_2O_2$ stabilized with pyridine carboxylic acids*

[Test method—gas evolution at 30° C.]

| Stabilizer conc. in 130 volume | | | | Dilution $H_2O$ | Percent active oxygen loss, year |
|---|---|---|---|---|---|
| Pyridine carboxylic acid | Calgon | $H_3PO_4$ | Total p.p.m. | | |
| | P.p.m. | P.p.m. | | | |
| Quinolinic, 221 p. p. m.+. | 169+ | 166 | 556 | Distilled | 0.8 |
| Commercial 130 vol. peroxide (stabilized). | | | | ---do---- | 10.8 |
| Dipicolinic, 221 p. p. m.+. | 169+ | 166 | 556 | ---do---- | .2 |
| Dipicolinic acid, 221 p. p. m. | | | | ---do---- | 1.4 |

Hereinafter it is to be understood that an aqueous solution of hydrogen peroxide refers to any concentration of hydrogen peroxide-water mixtures.

What is claimed is:

1. A stable aqueous hydrogen peroxide solution containing a pyridine carboxylic acid in stabilizing amounts 5 to 1000 parts per million.

2. A stable aqueous hydrogen peroxide solution containing dipicolinic acid in stabilizing amounts 5 to 1000 parts per million.

3. A stable aqueous hydrogen peroxide solution containing quinolinic acid in stabilizing amounts 5 to 1000 parts per million.

4. A stable aqueous hydrogen peroxide solution containing 6-methyl picolinic acid in stabilizing amounts 5 to 1000 parts per million.

5. The method of stabilizing an aqueous hydrogen peroxide solution which comprises adding to the peroxide from 5 to 1000 parts per million parts of solution of a pyridine carboxylic acid.

6. The method of stabilizing an aqueous hydrogen peroxide solution which comprises adding to the peroxide from 5 to 1000 parts per million parts of solution of an alkyl substituted pyridine carboxylic acid.

7. The method of stabilizing an aqueous hydrogen peroxide solution which comprises adding to the peroxide from 5 to 1000 parts per million parts of solution of dipicolinic acid.

8. The method of stabilizing an aqueous hydrogen peroxide solution which comprises adding to the peroxide from 5 to 1000 parts per million parts of solution of quinolinic acid.

9. The method of stabilizing an aqueous hydrogen peroxide solution which comprises adding to the peroxide from 5 to 1000 parts per million parts of solution of 6-methylpicolinic acid.

10. An aqueous hydrogen peroxide solution containing a pyridine carboxylic acid and a phosphate.

11. An aqueous hydrogen peroxide solution containing a pyridine carboxylic acid and a molecularly dehydrated phosphate.

12. The method of stabilizing an aqueous hydrogen peroxide solution which comprises adding to the peroxide a pyridine carboxylic acid, a molecularly dehydrated phosphate, and phosphoric acid.

FRANK P. GREENSPAN.

REFERENCES CITED

The following references are of record in the file of this patent:

UNITED STATES PATENTS

| Number | Name | Date |
|---|---|---|
| 1,758,920 | Baum | May 20, 1930 |
| 2,012,462 | Agthe et al. | Aug. 27, 1935 |
| 2,027,838 | Reichert | Jan. 14, 1936 |
| 2,371,691 | Hawkinson et al. | Mar. 20, 1945 |
| 2,436,660 | Mueller | Feb. 24, 1948 |
| 2,491,732 | Hawkinson et al. | Dec. 20, 1949 |